United States Patent [19]
Sekiguchi

[11] Patent Number: 5,283,719
[45] Date of Patent: Feb. 1, 1994

[54] HEADLAMP AND METHOD FOR FORMING THE SAME

[75] Inventor: Tsuneo Sekiguchi, Tokyo, Japan

[73] Assignee: Stanley Electric Co., Ltd., Tokyo, Japan

[21] Appl. No.: 856,510

[22] Filed: Mar. 24, 1992

[30] Foreign Application Priority Data

Mar. 27, 1991 [JP] Japan .................... 3-85925

[51] Int. Cl.⁵ .............................................. F21M 3/00
[52] U.S. Cl. ............................................ 362/61; 362/80
[58] Field of Search ............ 362/61, 80, 83, 368, 362/458

[56] References Cited

U.S. PATENT DOCUMENTS

| | | | |
|---|---|---|---|
| 4,198,674 | 4/1980 | Ilhage et al. | |
| 4,475,148 | 10/1984 | Tomforde | 362/80 |
| 4,670,818 | 6/1987 | Moebius | 362/61 |
| 4,736,279 | 4/1988 | Yamai et al. | 362/80 |
| 5,010,456 | 4/1991 | Reichman et al. | 362/80 |
| 5,032,955 | 7/1991 | Jurgens | 362/80 |
| 5,081,564 | 1/1992 | Mizoguchi et al. | 362/80 |
| 5,154,505 | 10/1992 | Sasamoto | 362/80 |

FOREIGN PATENT DOCUMENTS

0468753A1  1/1992  European Pat. Off.

*Primary Examiner*—Richard R. Cole
*Attorney, Agent, or Firm*—Frishauf, Holtz, Goodman & Woodward

[57] ABSTRACT

A headlamp for a vehicle having a lengthwise direction, includes a front lens; a housing having a plurality of mounting bosses for mounting the housing to the vehicle and a lens fitting groove for mounting the front lens to the housing, the mounting bosses and the lens fitting groove extending in a direction in which the housing is removed from a mold and which is substantially perpendicular to the lengthwise direction when the housing is installed on the vehicle, and a lamp body encased in a chamber formed by the front lens and the housing.

11 Claims, 2 Drawing Sheets

HEADLAMP AND METHOD FOR FORMING THE SAME

BACKGROUND OF THE INVENTION

1. Field of the Invention

The present invention relates to a headlamp mounted on an automobile, and to a method for constructing the headlamp.

2. Description of the Prior Art

FIG. 3 shows an example of a construction of a conventional headlamp 90. As shown, a lamp body 93 of a projector type is encased in a chamber defined by a housing 91 so that at the time of molding, a removing direction D of the housing from a mold is set in a lengthwise direction of the vehicle, indicated by arrow M in the figure and a front lens 92 is mounted so as to cover the housing 91. When the headlamp 90 is mounted on a vehicle body 10, it is normally mounted by screws or the like in the lengthwise direction M of the vehicle which provides a restriction in construction of the mold for forming the housing 91.

However, there are problems with the headlamp 90 having the aforementioned conventional construction, as follows:

(1) In response to recent automobile designs in which the front lens 92 is extended into the side of the vehicle, a lens fitting groove 91a which is provided in the housing 91 in order to mount the housing 91 and the front lens 92 together, is exposed to the side. In order to conceal this, the shapes of the housing 91 and the front lens 92 become complicated, which makes formation of the same difficult.

(2) At the same time, the side portion 92a of the front lens 92 which is extended to the side of the vehicle 92, assumes a state substantially parallel with the removing direction of the mold. Therefore, adjustment of the distribution of light to the side portion 92a or of the lens cutting for the purpose of ornamental appearance is difficult to perform. There are further limitations in terms of performance as well as design as a result thereof.

(3) The outside of the vehicle 10 provides a narrow space which makes it difficult to secure a mounting position of the headlamp 90 to the vehicle 10.

SUMMARY OF THE INVENTION

For solving the aforementioned problems, the present invention provides a headlamp in which a lamp body is encased by a front lens and a housing, the improvement being that the removing direction of a mold at the time of molding the housing intersects the lengthwise direction of a vehicle at a right angle.

DETAILED DESCRIPTION OF THE PREFERRED EMBODIMENTS

Figure 1:
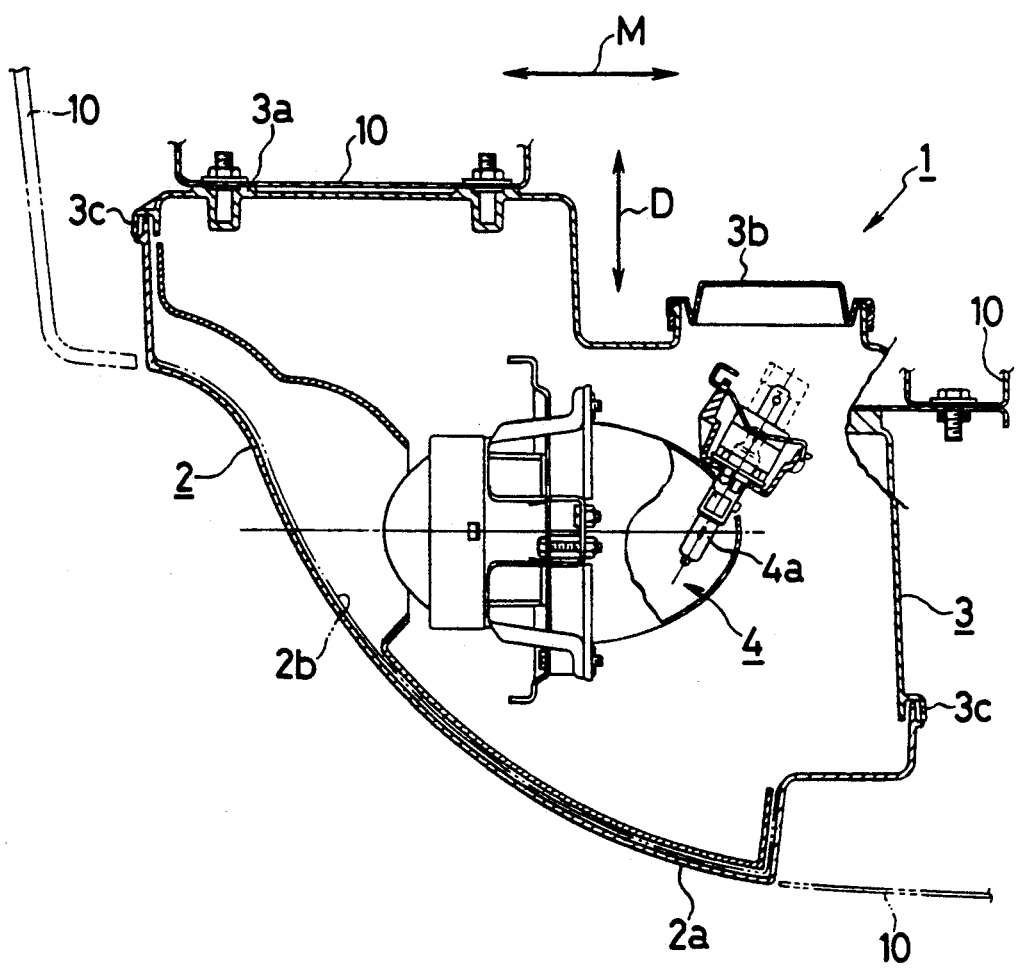
FIG. 1 is a sectional view showing one embodiment of a headlamp according to the present invention.

The present invention will now be described in detail in connection with one embodiment shown in the drawings.

In FIG. 1, reference numeral 1 designates a headlamp according to the present invention. The headlamp 1 is similar to that shown in the prior art in that a lamp body 4 is encased in a chamber formed by a front lens 2 and a housing 3. In the present invention, however, the housing 3 is formed in a mold so that the housing 3 is removed from the mold along a removing direction D which intersects at a right angle with the lengthwise direction M of the vehicle.

The removing direction D is set at a right angle to the lengthwise direction M of the vehicle, whereby the mounting bosses 3a for mounting the housing 3, and thereby the headlamp 1, on vehicle 10 and which are formed simultaneously with molding of the housing 3, are also provided in parallel with the removing direction D. Accordingly, the headlamp 1 is threadedly mounted in a direction which intersects the lengthwise direction M of the vehicle at a right angle. Similarly, a bulb replacing opening 3b, which is provided to replace a bulb 4a of the lamp body 4, has a central axis that is also provided in parallel with the removing direction D.

Since the housing 3 is set with respect to the removing direction D, a lens fitting groove 3c formed integral with the housing 3 and provided to mount the front lens 2 is also formed along the removing direction D. In addition, it is preferable that the removing direction from the mold at the time of molding the front lens 2 is also suitably changed to a direction parallel with the removing direction D.

The function and effect of the headlamp 1 constructed as described above will now be described. First, since the removing direction D of the housing 3 is set to intersect the lengthwise direction M of the vehicle at a right angle, the lens fitting groove 3c is not exposed to the side. Further, the shapes of the front lens 2 and the housing 3 are simplified, and these shapes can be varied with great freedom. Thus, the increase in freedom in terms of design and the simplification in terms of manufacture are greatly facilitated.

In the front lens 2, the side portion 2a along the side of the vehicle intersects the removing direction D of the mold substantially at a right angle. This facilitates execution of a lens cut 2b for ornamental appearance or the like with respect to the side portion 2a, and particularly, the enhancement of the beauty of the side portion 2a.

In addition, because the removing direction D of the housing 3 intersects the lengthwise direction M of the vehicle at a right angle, the mounting boss 3a can be provided on a side in which the surface contact with the vehicle 10 is wide, thus securing a sufficient mounting area to provide a strong mounting.

Figure 2:
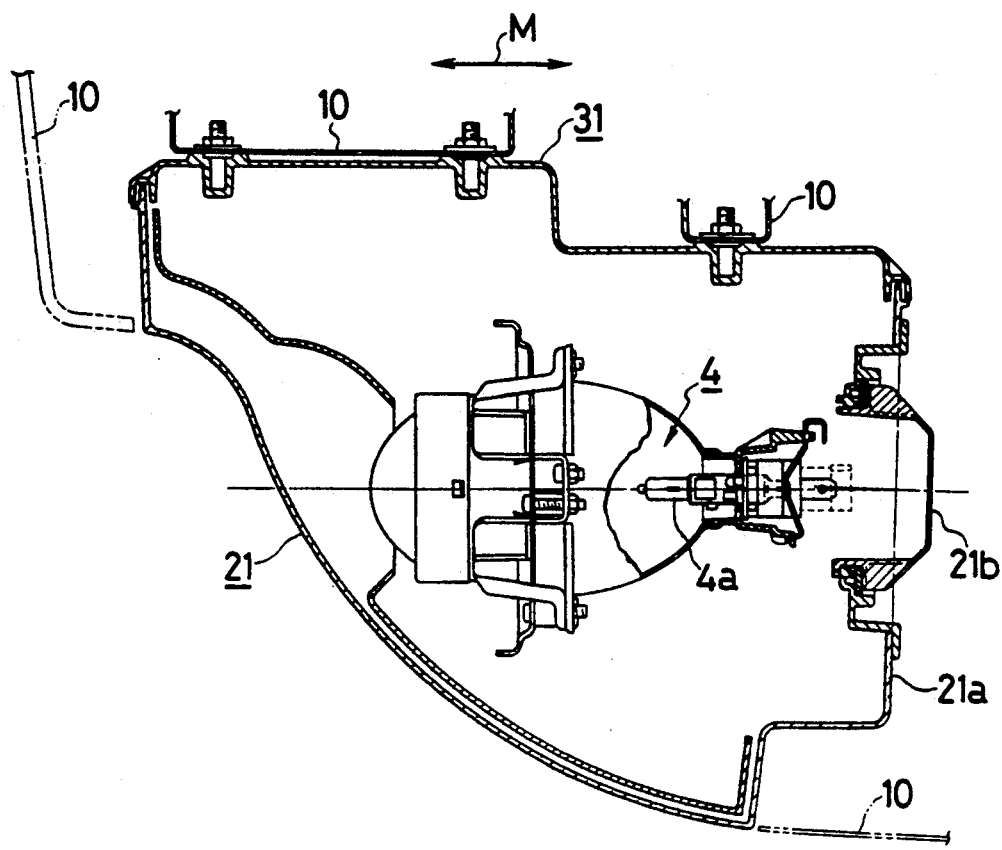
FIG. 2 is a sectional view showing a further embodiment of a headlamp according to the present invention.
Figure 3:
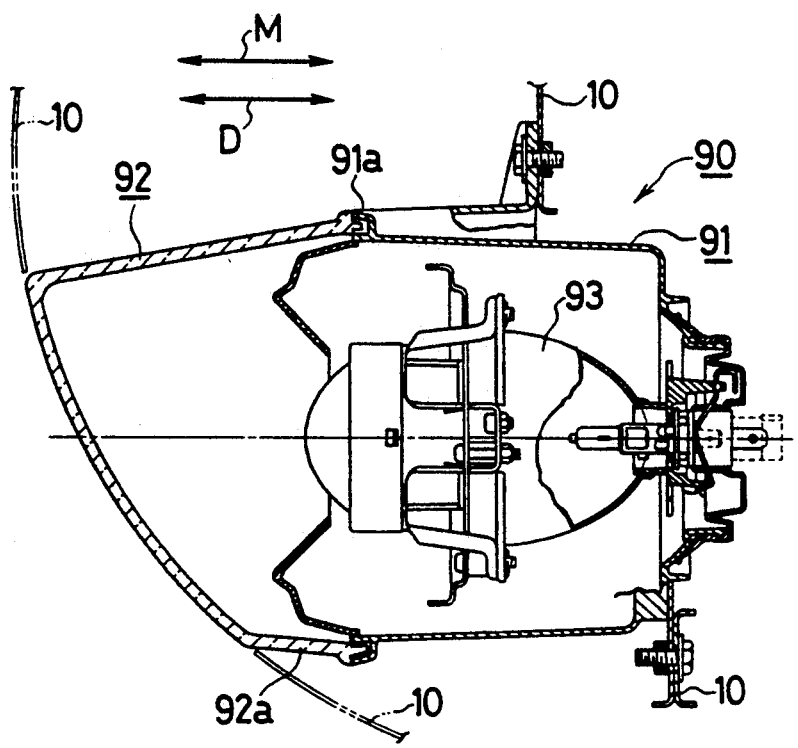
FIG. 3 is a sectional view of a conventional headlamp.

FIG. 2 shows a modified embodiment of the present invention. In this embodiment, a leg 21a of a front lens 21 is extended to a position to the rear of the lamp body 4 at the rear of the vehicle. In the thus extended leg 21a, a bulb replacing opening 21b corresponding to the lamp body 4 is provided on a side in the lengthwise direction M of the vehicle by applying the above procedure to a lengthwise mold.

With the above-described arrangement, the majority of the combined surface between the front lens 21 and the housing 31 is substantially perpendicular to the removing direction. Thus, the housing 31 is in the form of a shallow plate, and the structure thereof is simplified. The bulb replacing opening 21b is provided at a position similar to that of the prior art. For example, replacement of a bulb can be accomplished by means of a conventional procedure.

The functions and effects other than those described with respect to the embodiment of FIG. 2, are similar to those of the previous embodiment of FIG. 1, and a detailed description thereof will be omitted.

As described above, according to the present invention, in the structure of the headlamp, the removing direction at the time of molding the housing is set to a direction which intersects the lengthwise direction of the vehicle at a right angle. Therefore, even in the case in which the front lens is extended to the side of the vehicle, a joint portion between the front lens and the housing is not exposed to the side of the vehicle, thus exhibiting an improved external appearance and providing a simplification of manufacture.

With the aforementioned structure, the side portion of the front lens, which is required to have a high-degree of performance in terms of design or sideward diffusion of light, is substantially perpendicular to the removing direction of the mold. Therefore, the lens cut for the side portion is made free, thus exhibiting an improved external appearance as well as enhanced performance.

In addition, with the aforementioned structure, mounting of the headlamp on the vehicle can be carried out at a position on the vehicle which intersects the moving direction at a right angle, to secure a sufficient mounting area in order to provide a positive mounting.

I claim:

1. A headlamp for a vehicle, said headlamp emitting light substantially along a lengthwise direction, said headlamp comprising:
    a molded housing including:
        housing mounting means for mounting said housing to the vehicle, said mounting means extending in a direction which said housing is removed from a mold and which substantially perpendicular to said lengthwise direction, and
        a bulb replacing opening having an axis substantially perpendicular to said lengthwise direction, wherein said housing can be removed from a mold for forming said housing in a direction substantially perpendicular to said lengthwise direction,
    a front lens secured to said housing to form, with said housing, a lamp chamber, and
    a lamp body encased in said chamber, said lamp body including bulb mounting means for mounting said bulb at a predetermined angle to said lengthwise direction, said bulb mounting means being accessible through said bulb replacing opening.

2. A headlamp according to claim 1, wherein said housing has lens mounting means for mounting said front lens to said housing, said lens mounting means extending in a direction substantially perpendicular to said lengthwise direction.

3. A headlamp according to claim 2, wherein said lens mounting means includes a lens fitting groove extending in said direction which is substantially perpendicular to said lengthwise direction.

4. A headlamp according to claim 1, wherein said housing mounting means includes at least one mounting boss extending in a direction which is substantially perpendicular to said lengthwise direction.

5. A headlamp according to claim 1, wherein said housing includes a rear section, as viewed in said lengthwise direction, and said front lens extends to said rear section.

6. A headlamp for a vehicle, said headlamp emitting light along a lengthwise direction, said headlamp comprising:
    a front lens;
    a molded housing including:
        lens mounting means for mounting said front lens to said housing, said lens mounting means extending in a direction substantially perpendicular to said lengthwise direction, and
        a bulb replacing opening having an axis substantially perpendicular to said lengthwise direction, wherein said housing can be removed from a mold for forming said housing in a direction substantially perpendicular to said lengthwise direction, and
    a lamp body encased in a chamber defined by said front lens and said housing, said lamp body including bulb mounting means for mounting said bulb at a predetermined angle to said lengthwise direction, said bulb mounting means being accessible through said bulb replacing opening.

7. A headlamp according to claim 6, wherein said housing includes a rear section, as viewed in said lengthwise direction, and said front lens extends to said rear section.

8. A headlamp according to claim 7, wherein said lens mounting means includes a lens fitting groove extending in said direction which is substantially perpendicular to said lengthwise direction.

9. A method of forming a housing for a headlamp of a vehicle such that said headlamp is configured to emit light in a lengthwise direction, the headlamp including a front lens secured to said housing to form a lamp chamber with said housing and a lamp body encased in said chamber, said method comprising the steps of:
    molding said housing in a mold including the step of forming a bulb replacing opening in correspondence with said lamp body, on said housing such that said bulb replacing opening has an axis substantially perpendicular to said lengthwise direction; and
    removing said housing from the mold in a direction substantially perpendicular to said lengthwise direction.

10. A method according to claim 9, wherein said step of molding includes the step of forming housing mounting means for mounting said housing to the vehicle, on said housing such that said mounting means extends in said direction in which said housing is removed from said mold and which is substantially perpendicular to said lengthwise direction.

11. A method according to claim 9, wherein said step of molding includes the step of forming lens mounting means for mounting said front lens to said housing, on said housing such that said lens mounting means extends in said direction in which said housing is removed from said mold and which is substantially perpendicular to said lengthwise direction.

* * * * *